H. J. ZIEMAN.
LEVEL.
APPLICATION FILED JAN. 21, 1921.
1,435,365.
Patented Nov. 14, 1922.
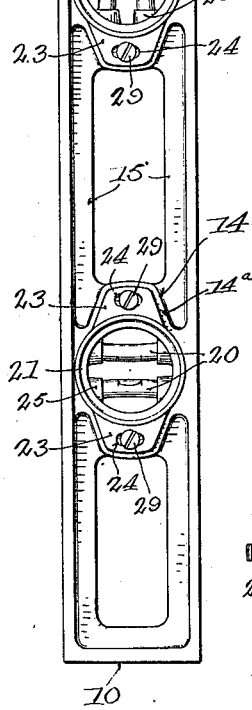
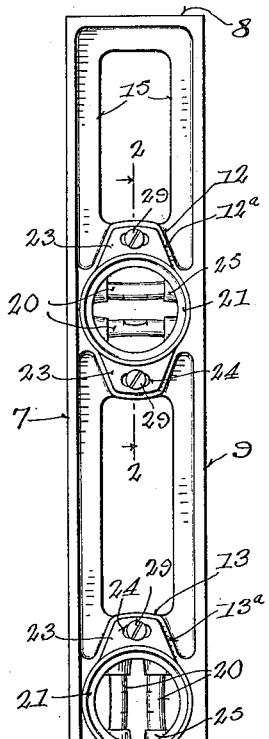
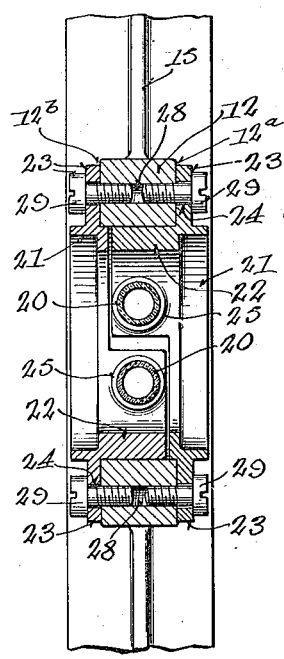
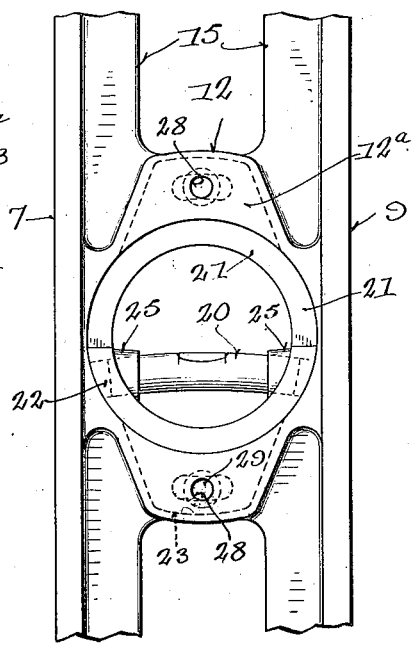
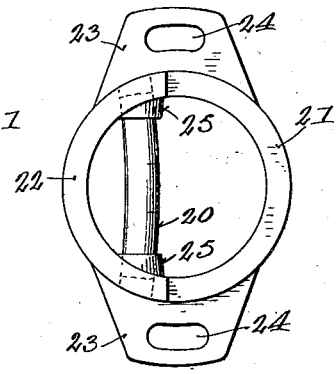
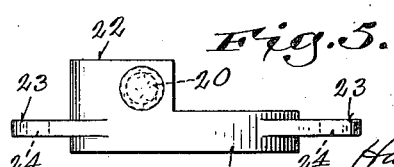
INVENTOR.
Harry John Zieman.
BY
Erwin Wheeler & Woolard
ATTORNEYS.

Patented Nov. 14, 1922.

1,435,365

UNITED STATES PATENT OFFICE.

HARRY JOHN ZIEMAN, OF MILWAUKEE, WISCONSIN.

LEVEL.

Application filed January 21, 1921. Serial No. 438,816.

*To all whom it may concern:*

Be it known that I, HARRY JOHN ZIEMAN, a citizen of the United States, residing at Milwaukee, county of Milwaukee, and State of Wisconsin, have invented new and useful Improvements in Levels, of which the following is a specification.

My invention relates to improvements in levels. More particularly, my invention relates to improvements in means whereby the spirit-tubes of levels may be adjusted with accuracy relative to the plane surface of the level in conjunction with which the spirit-tubes are used.

The object of my invention is to provide a level with separately adjustable spirit-glasses associated with each of the plane surfaces of the level and adapted respectively to determine when these surfaces are horizontal and vertical.

Another object of my invention is to provide a level of such construction that a pair of spirit-glasses is mounted within each sight opening, each of the glasses being adjustable relative to the plane surface with which it is associated without interfering with the adjustment of the adjacent glass.

Another object of my invention is to provide means whereby a pair of spirit-glasses, thus adjustably mounted within a single sight opening and independently adjustable therein, may be supported rigidly in a fixed and accurate relation to the frame of the level when the proper adjustment has been secured.

In the drawings:

Fig. 1 is a side elevation of a level embodying my invention.

Fig. 2 is a section taken on line 2—2 of Fig. 1 showing on a larger scale one of the barrels within which the spirit-tubes are mounted.

Fig. 3 is a plan view of the side opening shown in Fig. 2, one of the spirit-tubes and its retaining device being positioned therein.

Fig. 4 is a plan view of one of the spirit-tube retaining barrels.

Fig. 5 is a side elevation of the same.

Fig. 6 is a plan view of another form of spirit-tube retaining barrel.

Like parts are identified by the same reference characters thruout the several views.

I prefer to construct my improved level of a light metal, such as aluminum, rather than of wood because a metal level is more durable than a wooden level of corresponding quality, and being more durable, will stand much harder use and still retain the fineness of adjustment which is made possible by my invention. The level illustrated comprises a rectangular frame having four plane surfaces 7, 8, 9 and 10. In the construction of this frame, great care should be taken to make each pair of opposed surfaces as nearly as possible perfectly parallel. Thus the plane surface 7 will be parallel to the plane surface 9 and the plane surface 8 will be parallel to the plane surface 10. Plane surfaces 8 and 10 will intersect surfaces 7 and 9 at right angles. A plurality of bearing members 12, 13 and 14 are cast integrally with the rectangular frame intermediate of its ends forming reenforcement for the side bars 7 and 9 of the frame. Additional reenforcement is secured by the webbing 15. It will be understood that the bearing members 12, 13 and 14 are of substantially greater thickness than the webbing 15, as appears clearly in Fig. 2. The outer surfaces $12^a$ and $12^b$, $13^a$ and $13^b$, and $14^a$ and $14^b$ of the bearing members 12, 13 and 14 are carefully constructed so that the surfaces $12^a$, $13^a$ and $14^a$ all lie in the same plane and the surfaces $12^b$, $13^b$ and $14^b$ all lie in the same plane, both of said planes being parallel to each other and to the median line of plane surfaces 7 and 9.

Each of the bearing members 12, 13 and 14 is provided with a central aperture of large diameter within which the spirit-tube retaining devices are rotatively adjustable. Each of the spirit-tubes 20 is mounted within one of said retaining devices which is best illustrated in Fig. 5. These devices will be hereinafter referred to as barrels. Each of them may comprise an annulus 21 provided with a segment 22 extended parallel to the axis of the annulus and a pair of ears 23 slotted at 24 to permit of the adjustment of the barrel within the bearing in which the annulus and segment are rotatively mounted. The spirit-tube 20 may be mounted upon the barrel within the socket 25 carried by the segment 22. Holes of a bore adapted to receive the spirit-tube may be bored thru segment 22 and thru the socket member 25 so that the spirit-tube may be inserted thru the segment 22. The opening may then be sealed up, presenting the appearance shown in Fig. 5.

It will be understood that in each spirit level which is provided with three sight apertures as is the level shown in Fig. 1, two sorts of barrels will be required. For use in bearing members 13, I have provided the barrel shown in Fig. 6 wherein the ears 23 project from the barrel upon a diameter which is parallel to the axis of the spirit-tube 20; whereas in the barrel shown in Figs. 4 and 5, which is adapted for use in the ears 23 in bearing members 12 and 14, the ears 23 project from the barrel upon a diameter at right angles to the axis of tube 20. It will thus be apparent to those skilled in the art that the spirit-tubes within the bearing member 13 will be adapted when properly adjusted, to determine whether or not plane surfaces 7 and 9 are horizontal while the spirit-tubes in bearing members 12 and 14 will be adapted when properly adjusted to determine whether the plane surfaces 7 and 9 are vertical. The bearing members 12, 13 and 14 are each provided with the threaded openings 28 adapted to receive the screws 29 which pass thru the slots 24 and may be tightened upon ears 23 to hold the respective barrels in place after the proper adjustment has been secured.

It will be remembered that the surfaces 12$^a$, 13$^a$ and 14$^a$ are all in one plane as are also the surfaces 12$^b$, 13$^b$ and 14$^b$. The two planes above referred to are parallel to each other and to the longitudinal median line of the instrument. They are also normal to the transverse direction of plane surfaces 7 and 9. Accordingly it will be apparent to those skilled in the art that when the ears 23 of each spirit-tube retaining device or barrel are tightened against the bearing surfaces above mentioned, the tubes 22 within the barrels will be accurately disposed parallel to the several median lines of the level frame. Thus it is possible to true up a surface accurately to make it level in one direction altho it has a transverse pitch. If the spirit-tube were not parallel to the median line of the instrument great inaccuracy would result, as is well known in the art.

By referring to Fig. 2, it may be seen that the bearing member 12 is of sufficient thickness so that when the two spirit-tube retaining barrels have been inserted from opposite sides of the bearing member until the ears 23 seat firmly upon the faces 12$^a$ and 12$^b$ respectively, the segment 22 will be adjacent to, but not in contact with, the annulus 21 of the opposing barrels. The segmental portions 22 of the barrel terminate in a chord sufficiently less than the diameter of the barrel so that considerable rotative adjustment of each barrel is possible without interfering with the adjustment of the opposing barrel.

In actual practice, my improved level will be assembled and adjusted as follows. The casting comprising frame members 7, 8, 9 and 10 integral with the web 15 and the bearing blocks 12, 13 and 14 will first be trued up as hereinbefore described. Two barrel members, such as are shown in Figs. 4 and 5, containing tubes 20, will now be inserted within the bearing block 12 from opposite sides thereof and the screws 29 will be turned up to hold the barrels in place within the bearing block. Preferably they will have a snug fit therein. Two similar barrels will be mounted in the bearing block 14 near the opposite end of the level and will be held in place by screws 29. Two barrels, such as are pictured in Fig. 6, will now be inserted into bearing block 13 from opposite sides thereof and will be held therein by screws 29. To adjust the various spirit-tubes, the level will now be held against a plane surface which is known to be absolutely vertical. The spirit-tubes 20 and the barrel by which they are supported will now be rotated within the bearing blocks 12 and 14 until the bubble within the tube registers with the hair line upon the tube in the usual manner. The screws 29 which hold the barrel so adjusted will now be tightened to maintain the adjustment. The level will now be turned end for end so that the opposing barrels in each of said bearing blocks may be adjusted.

In adjusting the barrels within bearing member 13 the plane surface 9 is first laid upon a surface known to be level and the barrel of which the ears 23 bear upon surface 13$^a$ will be turned until the bubble within tube 20 registers level. Screws 29 will now be tightened to maintain the adjustment. The level will then be turned over so that the plane surface 7 rests upon the known level surface whereupon the barrel which has its ears 23 bearing upon surface 13$^b$ is adjusted until the bubble within tube 20 registers level. The barrel is then tightened by screws 29 as before.

The spirit-tubes mounted within the adjustable supporting devices or barrels may be of any approved kind. Those illustrated herein are slightly curved or bowed, the reading being taken by noting the position of the bubble within the tube with reference to the hair lines etched upon the tube near its highest point. It will be understood that any other type of spirit-tube will serve equally well the purpose of this invention. Preferably, however, the tube is made with great care to have it unusually uniform thruout in order that the great accuracy made possible by my invention may not be lessened by inaccuracies elsewhere in the device.

It will be understood that the adjustable spirit-tube supporting devices herein described are applicable to wooden levels or levels made in designs different from that here illustrated. But I have found that the metal level frame contributes to the permanency of the fine adjustment possible with the use of the spirit-tube supporting members shown and described above. The design of the frame is also important in promoting accuracy and permanency of adjustment. The cylindrical segments 22 closely fitted within bearing blocks 12, 13 and 14 provide a large bearing surface with no possibility of play between the barrel and its bearing. Likewise the ears 23 secured at two points upon the broad plane surfaces *a* and *b* of each bearing block insure rigidity and cooperate with the large bearing surface of the segment 22 to that end.

The fact that the spirit-tubes are adjustable and may be thus securely fixed upon the level frame makes it possible to replace a broken glass in a few minutes time and the level thus provided with a new spirit-glass will be as accurate when the glass is adjusted as it was in the first instance. It will therefore be apparent that a level embodying my invention may be given hard usage over a long period of years without destroying its character of a fine precision instrument.

I claim:

1. In a level, the combination of a frame with a transverse cylindrical aperture, annular members journaled in each end of the aperture, spirit-glasses carried by each annulus, and means whereby each annulus may be secured against rotation.

2. In a spirit level, the combination with a frame including two substantially parallel plane surfaces and provided with a bearing portion having an aperture transversely disposed between said surfaces, of annular members journaled in each end of the aperture with segmental portions extended thru the aperture toward the opposing annular member, and spirit-glasses mounted upon each of said segmental extensions.

3. In a spirit level, the combination with a frame including two substantially parallel plane surfaces and provided with a bearing portion having an aperture transversely disposed between said surfaces, of annular members journaled in each end of the aperture with segmental portions extended thru the aperture toward the opposing annular member, and spirit-glasses mounted upon each of said segmental extensions, the spirit-glasses being disposed within a plane common to the longitudinal median lines of both of said parallel surfaces.

4. In a spirit level, the combination with a frame including two substantially parallel plane surfaces and provided with a bearing portion having an aperture transversely disposed between said surfaces, of annular members journaled in each end of the aperture with segmental portions extended thru the aperture toward the opposing annular member, and spirit-glasses mounted upon each of said segmental extensions, the spirit-glasses being disposed within a plane common to the longitudinal median lines of both of said parallel surfaces, and each of said glasses being adjustable within said plane independently of the other.

5. In a spirit level, a frame, a plurality of bearing blocks having sight apertures disposed transversely of the frame, annular members journaled in each end of each aperture, segmental extensions of the wall of each annulus, and spirit glasses carried by said segmental extensions, each annular member being separately adjustable within the bearing block.

6. A level comprising a frame, a plurality of bearing blocks associated therewith and provided with sight openings disposed transversely of the frame, a separately adjustable annulus mounted within each end of each aperture and provided with a cylindrical segmental extension of its wall within the aperture, and a spirit-glass mounted upon each segmental extension.

7. A level comprising a frame, a plurality of bearing blocks associated therewith and provided with sight openings disposed transversely of the frame, a separately adjustable annulus mounted within each end of each aperture and provided with a cylindrical segmental extension of its wall within the aperture, and a spirit-glass mounted upon each segmental extension, each annulus having a limited rotative movement within the aperture and means for securing it against rotation whereby the several spirit-glasses may be adjusted to show the vertical or horizontal position of the portion of the frame with which they are respectively associated.

8. A level comprising a rectangular frame having two superimposed and parallel plane working surfaces and provided with a plurality of sight apertures, a pair of spirit-glasses within each opening, and an annulus having a segmental extension supporting each glass, whereby each glass is separately adjustable and all of said glssses lie in a plane common to the longitudinal median lines of both of the working surfaces.

HARRY JOHN ZIEMAN.